United States Patent [19]
Falk

[11] Patent Number: 6,000,485
[45] Date of Patent: Dec. 14, 1999

[54] TRACKED VEHICLE

[75] Inventor: Alfons Falk, Bonassund, Sweden

[73] Assignee: Hagglunds Vechicle AB, Ornskoldsvik, Sweden

[21] Appl. No.: 09/117,465

[22] PCT Filed: Jan. 27, 1997

[86] PCT No.: PCT/SE97/00123

§ 371 Date: Aug. 13, 1998

§ 102(e) Date: Aug. 13, 1998

[87] PCT Pub. No.: WO97/28039

PCT Pub. Date: Aug. 7, 1997

[30] Foreign Application Priority Data

Jan. 30, 1996 [SE] Sweden .................................. 9600331

[51] Int. Cl.⁶ .............................. B62D 55/06; F16H 7/02; F41H 7/00
[52] U.S. Cl. ........................ 180/9.1; 180/9.28; 89/40.03
[58] Field of Search .................................... 180/9.1, 9.28, 180/9.3; 305/8, 120, 122; 89/32.13, 36.08, 36.13, 40.03, 40.13

[56] References Cited

U.S. PATENT DOCUMENTS 3,757,635  9/1973  Hickerson et al. .
4,600,069  7/1986  Oswald et al. .
4,737,055  4/1988  Scully .......................................... 410/76
5,498,060  3/1996  Satomi ...................................... 296/190

FOREIGN PATENT DOCUMENTS

| 0 479 016 | 4/1992 | European Pat. Off. . |
| 0 723 905 | 7/1996 | European Pat. Off. . |
| 1169351 | 12/1958 | France . |
| 1 907 050 | 10/1970 | Germany . |
| 36 09 374 | 10/1986 | Germany . |
| 37 25 920 | 2/1989 | Germany . |
| 41 23 778 | 4/1992 | Germany . |
| 195 02 036 | 1/1995 | Germany . |
| 44 20 632 | 1/1995 | Germany . |

*Primary Examiner*—Christopher P. Ellis
*Assistant Examiner*—Christopher D Bottorff
*Attorney, Agent, or Firm*—Young & Thompson

[57] ABSTRACT

The invention relates to a tracked motor vehicle (10) with an engine-equipped vehicle drive module (12) with two parallel track carrier units (14) attached to the sides of the drive module in the longitudinal direction of the vehicle. The drive module (12) is connected to a front part of the respective track carrier units (14) by means of a fastening trunnion (36) on the rear part of the drive module (12) and hollow fastening devices (38) on its front part. Vibration-damping rubber elements are arranged at the fastening trunnions and the fastening devices.

5 Claims, 3 Drawing Sheets

TRACKED VEHICLE

SUMMARY OF THE INVENTION

The following invention concerns a tracked motorized vehicle which comprises a vehicle body unit and two tracked carrier units arranged by the sides of the vehicle body unit and parallel to the longitudinal direction of the vehicle, where the vehicle body unit is formed as an engine-equipped vehicle drive module, which is connected to a front part of the respective tracked carrier units in order to give the vehicle a substantially U-shaped appearance when seen in plan view, whereby the rear parts of the tracked carrier units are cantilevered backwards from the vehicle drive module in order to form a completely free space between the rear parts of the tracked carrier units in order to be releasably connectable to a load module. The present invention consequently relates to a tracked motorized vehicle, which makes it possible to easily and quickly convert a tracked vehicle for another application, whereby different load modules can be releasably connected to the tracked vehicle through docking.

In order to permit a simple assembly and an easy dismantlability of the main component parts of such a tracked vehicle, viz. the vehicle drive module and the tracked carrier units, and simultaneously a vibration-damped attachment of the tracked carrier units in the drive module, it is proposed in accordance with a preferred embodiment of the present invention that the vehicle drive module has a rigid frame with fastening trunnions extending out from each side of its rear part for the attachment of the central part of a support beam of the respective tracked carrier unit and that the frame has, on each side of its front part, a hollow fastening device for fastening of a front end part of the beam of the respective tracked carrier unit, whereby the fastening trunnions resp. the fastening devices are connected to the respective beams via a rubber-elastic element.

Because each tracked carrier unit has, in a way known per se, a plurality of carrier wheels arranged in parallel rows on each side of the beam, it can be appropriate that the inner carrier wheels, which lie nearest to the vehicle drive module, lie somewhat in front of corresponding outer carrier wheels in the section of the tracked carrier in front of the fastening position for the fastening trunnion in the beam, while behind the fastening position for the fastening trunnion, the inner carrier wheels lie somewhat behind the corresponding outer carrier wheels. In this way, a gap is formed in the inner row of carrier wheels which is used for the elastic attachment of the fastening trunnion of the drive module. The carrier wheels in each tracked carrier can therefore be tightly packed with, consequently, a lower load on the rubber bushings of the swinging arms and a lower specific pressure against the ground through the drive tracks. By means of the mutual displacement in the longitudinal direction of the carrier wheels in the inner and outer rows of carrier wheels, a favourable plough-shape of the carrier wheels in the two track carriers in front of the fastening trunnion and a reversed plough-shape behind the fastening trunnion are achieved.

The rear parts of the track carrier units appropriately have means for their connection with the respective side parts of a load module, while the rear parts of the drive module have means for the connection with a front part of the load module. The means for the connection of the load module with the drive module and with the track carrier units appropriately comprise a vibration damping rubber-elastic element.

BRIEF DESCRIPTION OF THE DRAWINGS

The invention is described more closely below with reference to the appended drawings in which.

DETAILED DESCRIPTION OF THE INVENTION

Figure 1:
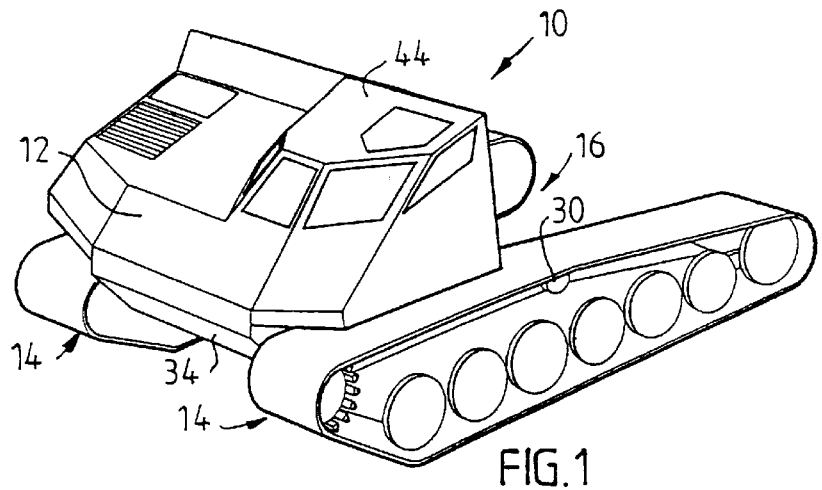
FIG. 1 is a schematic perspective view of a tracked vehicle drive module according to the present invention.
Figure 2:
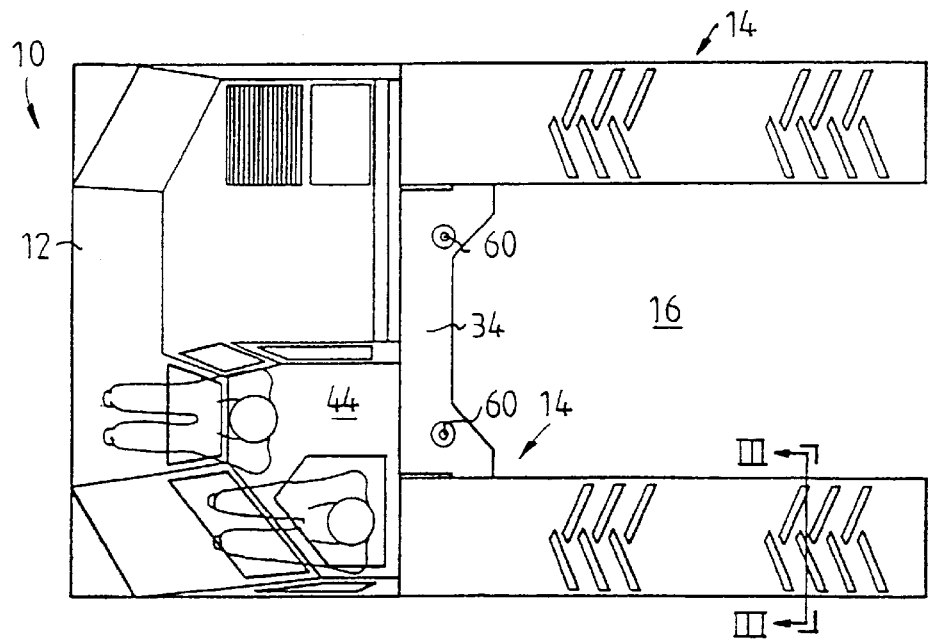
FIG. 2 is a plan view of the vehicle in FIG. 1.
Figure 4:
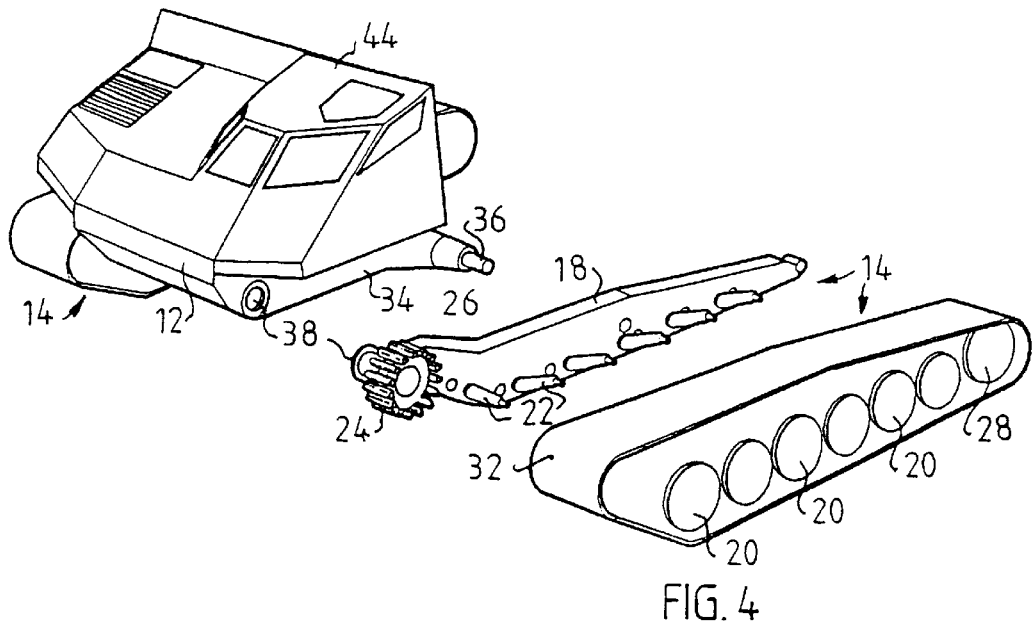
FIG. 4 shows an exploded perspective view of the vehicle according to the invention, where one track carrier is shown dismantled and removed from the vehicle drive module.

In FIGS. 1 and 2 a tracked motor vehicle according to the invention is referred to generally by 10. The fundamental construction of the vehicle 10 comprises an engine-equipped crew and drive module 12 and two track carrier units 14 mounted on its sides. As is shown more clearly in FIGS. 4 and 5, each track carrier units 14 has an elongated carrier beam 18 upon which a number of carrier wheels 20 are arranged in rows on each side of the beam 18 and rotatably mounted on this by means of respective swinging or torque arms 22 which are rotatably mounted in the beam 18 by a, not shown, torsion spring in the shape of a rubber bushing. The beam 18 further carries a track drive wheel 24 at its front, indented end 26, and a rotatable track tension wheel 28 at its rear end, together with at least one track support wheel 30 (FIGS. 1 and 6) on its upper side in order to support the upper running part of the drive track 32 of the track carrier.

Figure 5:
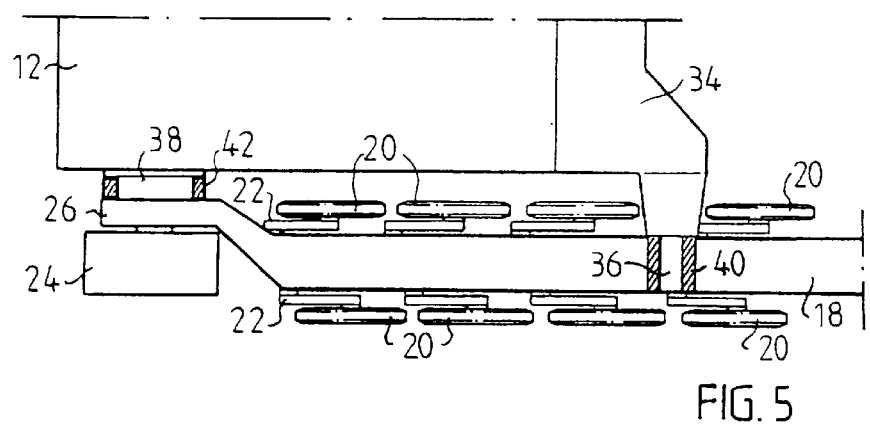
FIG. 5 is a plan view of a part of the vehicle drive module and a part of one track carrier mounted upon it, with certain parts left out.

The drive module 12 has a lower rigid frame 34 with a fastening trunnion 36 projecting outwardly from each side of its rear part, and a hollow fastening device 38 at a front side part of the frame 34. The fastening trunnion 36 and the fastening device 38 are intended for attachment of a respective central part and the indented front end part 26 of the beam 18 of the track carrier unit 14 by means of rubber-elastic vibration-damping elements 40 resp. 42 (FIG. 5). In the mounted state on the drive module 12 the track carrier units 14 in this way form cantilevered parts extending backwardly, which together with the drive module 12 form an essentially U-shaped vehicle configuration (FIG. 2) when seen in plan view with a completely free space 16 between the rear parts of the track carrier units 14. The object of this will be described below.

Figure 7:
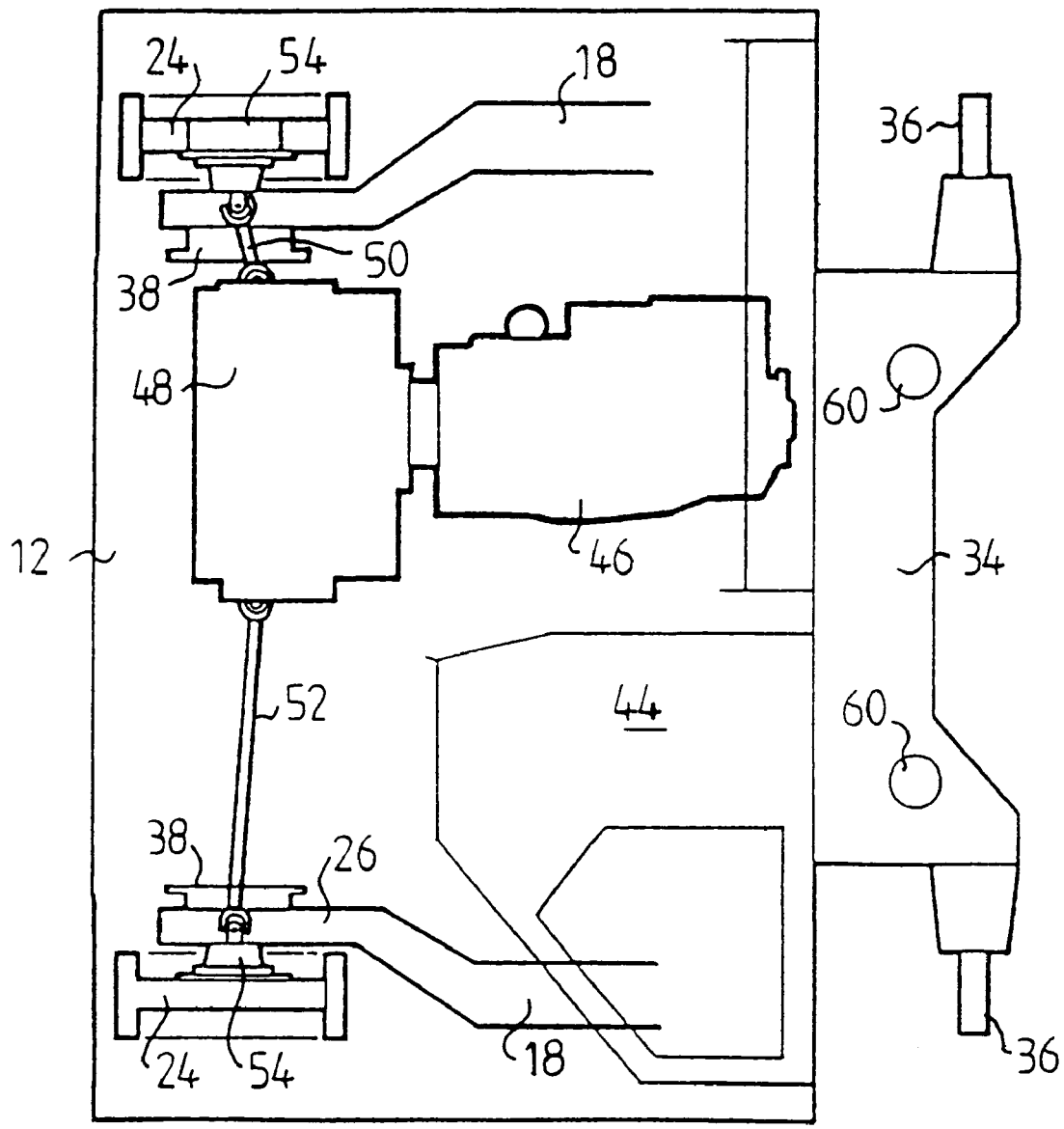
FIG. 7 shows schematically a drive system for the vehicle according to the invention.

As can be seen in FIG. 7, the crew and drive module 12 on its left side has furthermore a cabin 44 for a driver and a leader and a space to the right which contains a drive package comprising i.a. an internal combustion engine 46, a gearbox/power transmission 48 and universal drive shafts 50 resp. 52 for the track drive wheel 24 in each of the track carrier units 14. The drive shafts 50,52 thus extend through the hollow fastening devices 38 to a respective hub reduction gear 54 in each of the track drive wheels 24.

Figure 6:
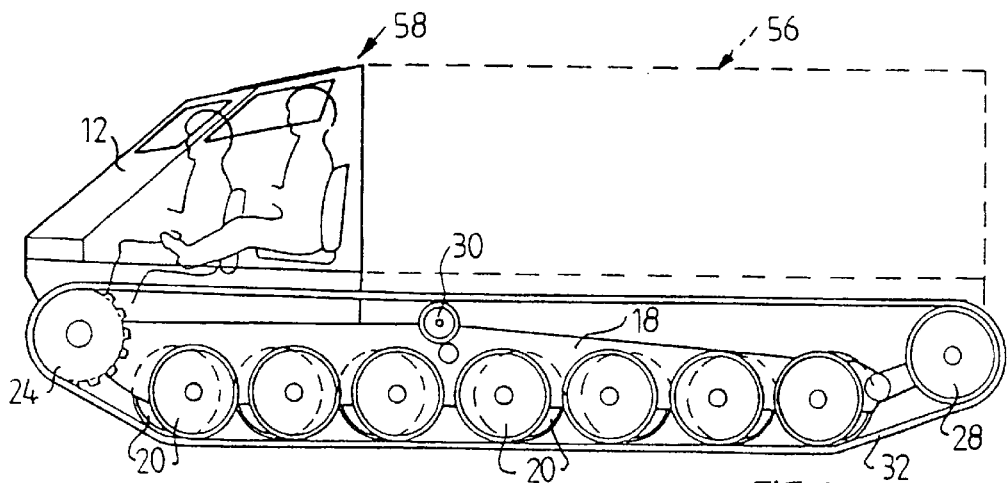
FIG. 6 is a side view of a tracked vehicle according to the invention with a load module, shown by dashed lines, mounted upon it.

Referring again to FIG. 5 it is shown that the fastenings of the swinging arms for the inner row of carrier wheels 20 in the beam 18 are displaced somewhat in front of the corresponding swinging arms 22 for the outer row of carrier wheels 20 in the section of the beam 18 which lies between the front and rear attachment points 38 resp. 36 on the drive module 12, which is also evident in FIG. 6. The pairs of inner and outer carrier wheels 20 in this section of the two track carrier units 14 in this way form a plough configuration, while the carrier wheel pairs behind the fastening trunnions 36 of the drive module 12 have an inverted plough configuration, i.e. the outer carrier wheels 20 lie somewhat in front of the inner ones. In this way, a compact arrangement of the carrier wheels 20 is achieved over the great part of the beam 18, which gives a reduced loading on the rubber bushings of the swinging arms 22 and a lower specific ground pressure through the drive tracks 32 with better driving characteristics as a consequence.

The vehicle 10 shown in FIGS. 1 and 2, comprised of the combined crew and drive module 12 and the two track carrier units 14, is intended to be releasably connected to an additional or load module 56 (see FIG. 6) for the intended use, in order to thereby form a complete vehicle unit, the appearance and function of which can be adapted to different intended uses by exchanging a load module 56 of one type with another.

Figure 3:
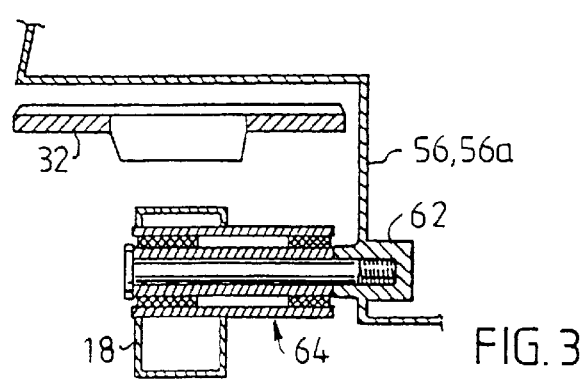
FIG. 3 is an enlarged cross-section, taken along line III—III in FIG. 2 through a part of one track carrier unit of the vehicle.

The load module 56, which thus can have different designs depending on the intended use of the vehicle unit, has a rigid body, equipped with a front attachment device (not shown) arranged to be releasably connected to a pair of rear coupling means 60 on the rear part of the frame 34 of the drive module 12. The body of the load module has furthermore rear side fastening devices 62 (FIG. 3) for releasable connection with inwardly directed coupling means 64 on the rear part of the beam 18 in the respective track carrier unit 14. When the load module is mounted on the drive module 12 respectively on the track carrier units 14, it contributes to a large degree to the stiffness and stability of the assembled vehicle unit 58 through an effective use of the inherent stiffness and weight of the load module body.

I claim:

1. Tracked motor vehicle (10) comprising a vehicle body unit (12) and two track carrier units (14) arranged parallel to the sides of the vehicle body unit and in the longitudinal direction of the vehicle, where the vehicle body unit is formed as an engine-equipped vehicle drive module (12) which is connected to a front part of the respective track carrier units (14) in order to give the vehicle, in plan view, an essentially U-shaped appearance, wherein the rear parts of the track carrier unit (14) are cantilevered backwards from the vehicle drive module (12) for forming of a completely free space (16) between the rear parts of the track carrier units (14) in order to therein be releasably connected to a load module (56), characterized in that the vehicle drive module (12) has a rigid frame (34) with a fastening trunnion (36) projecting outwardly from each side of its rear part for attachment of a central part of a support beam (18) of each respective track carrier unit (14), that the frame (34) has on each side of its front part a hollow fastening device (38) arranged for the attachment of a front end part (26) of the beam (18) of the respective track carrier unit (14), and that the fastening trunnions (36) respectively the fastening devices (38) are connected to the respective beam (18) via a rubber-elastic element (40, 42).

2. Tracked motor vehicle according to claim 1, in which each track carrier unit (14) has a plurality of carrier wheels (20) arranged in parallel rows on each side of the beam (18) on a respective swinging arm (22), characterized in that in front of the fastening point for the fastening trunnion (36) in the beam (18), the inner carrier wheels (20) lying nearest to the vehicle drive module (12) lie somewhat in front of corresponding outer carrier wheels (20), while behind the fastening point for the trunnion (36), the inner carrier wheels (20) lie somewhat behind the corresponding outer carrier wheels (20).

3. Tracked motor vehicle according to claim 1 characterized in that the rear parts of the two track carrier units (14) have means (64) for connection of the track carrier units (14) to a load module (56) placed between them.

4. Tracked motor vehicle according to claim 3, characterized in that the rear part of the vehicle drive module (12) has means (60) for connection of the vehicle drive module (12) to the load module (56).

5. Tracked motor vehicle according to claim 3, characterized in that the means (64,60) for connection of the track carrier units (14) respectively the vehicle drive module (12) to the load module (56) comprise a rubber-elastic element.

* * * * *